April 28, 1953 W. SARAGA 2,636,940

ELECTRIC IMPEDANCE NETWORK

Filed Aug. 9, 1948 2 SHEETS—SHEET 1

Inventor:
Wolja Saraga.
by Pierce, Scheffler & Parker,
Attorneys.

Inventor:
Wolja Saraga,
by Pierce, Scheffler & Parker,
Attorneys.

Patented Apr. 28, 1953

2,636,940

UNITED STATES PATENT OFFICE 2,636,940

ELECTRIC IMPEDANCE NETWORK

Wolja Saraga, Kent, England, assignor to Telephone Manufacturing Company Limited, London, England, a British company Application August 9, 1948, Serial No. 43,325
In Great Britain August 11, 1947

2 Claims. (Cl. 178—44)

This invention relates to variable electrical four-terminal networks, and more particularly to networks providing attenuation-frequency characteristics which can be varied by means of one or more adjustable resistances. The networks which are the subject of this invention are particularly useful as regulating networks in carrier telephone systems for the equalisation of open wire lines and cables the attenuation-frequency curves of which vary with temperature and weather conditions.

In networks for this specific purpose it is desirable that the attenuation-frequency characteristic should be variable in such manner that for different adjustments of the variable element the ratios of the changes of attenuation at each frequency from a reference curve are the same, i. e. do not depend on such adjustment. In other words, a network is required the attenuation-frequency characteristic of which, over a specified frequency range, is given by:

$$\alpha(f)=\alpha_0(f)+K\alpha_v(f) \qquad (1)$$

where $\alpha$, $\alpha_0$ and $\alpha_v$ are attenuation functions of the frequency $f$ and K is a numerical factor say between −1 and +1, which is independent of frequency.

It is already known that characteristics of this type can be obtained approximately in four-terminal networks having attenuation-frequency characteristics variable in accordance with the relation:

$$\alpha=\alpha_0+20\ \log._{10}\frac{1+\gamma A}{\gamma+A} \qquad (2)$$

where $\alpha$ is the attenuation in decibels, $\alpha_0$ and $A$ are specified functions of the frequency, and $\gamma$ is a real parameter depending on the values of the variable network element or elements but not on frequency.

It is an object of the present invention to provide a four terminal network in which this attenuation-frequency characteristic may be obtained and varied and according to the invention such a network can be obtained by using a four terminal network comprising a variable impedance network N with impedance $Z_n$ and arranging for the current in $Z_n$ to be substantially independent of the value of $Z_n$, and making $Z_n$ to depend on frequency in accordance with the following expression:

$$Z_n=Z_0\frac{\gamma+A}{1+\gamma A} \qquad (2a)$$

where $\gamma$ and A are as defined above and where $Z_0$ depends on the desired function $\alpha_0$.

Figure 1:
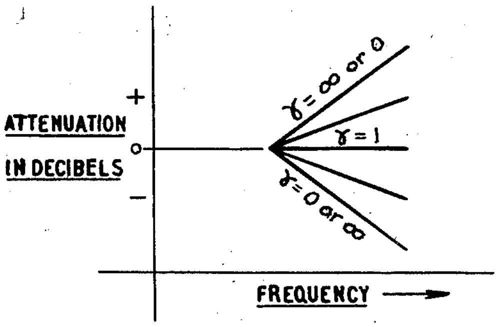
Figure 2:
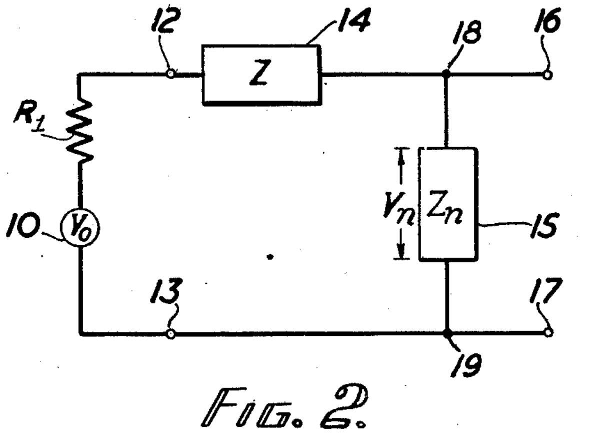

In the accompanying drawing, Figure 1 is a diagram indicating an example of an attenuation-frequency characteristic which it may be the object of the invention to attain as closely as possible, Figure 2 shows diagrammatically a complete network according to the invention, and Figures 3 to 6 alternative variable networks for incorporation in the complete network.

Figure 1 shows the variable part $K\alpha_v(f)$ of a series of attenuation-frequency characteristics over a limited range which it may be the object of a network according to the invention to attain as closely as possible. This diagram indicates attenuation in decibels plotted against frequency, and the object of the invention is to provide a network the characteristic of which can be varied to approximate any of those shown or any of the intermediate curves.

In Figure 2 a source 10 of alternating voltage is applied through a resistance $R_1$ representing the internal resistance of the source 10, to the input terminals 12, 13 of a four-terminal network comprising a series impedance 14 of value Z and a variable shunt impedance 15 of value $Z_n$ connected across the output terminals of the network 16, 17 by terminals 18, 19.

Figure 3:
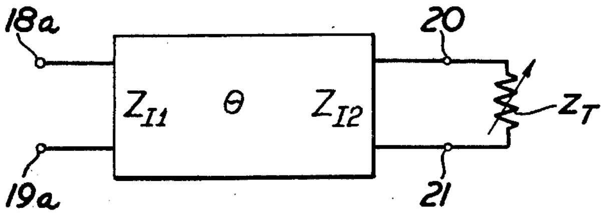
Figure 4:
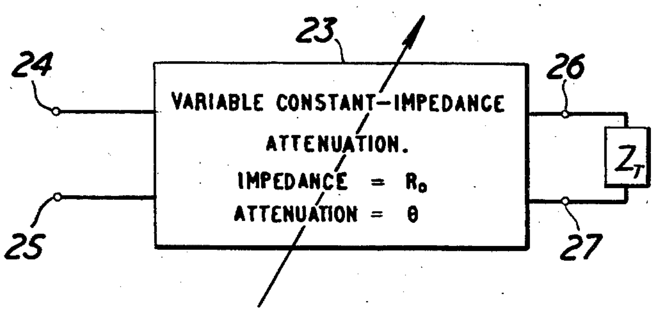

Various networks may be used for the impedance 15, and one such network is indicated diagrammatically in Figure 3. This comprises a four-terminal network with input terminals 18a, 19a and output terminals 20, 21, the latter being joined by a variable resistance $Z_T$; the impedance presented by the network at its terminals 18a, 19a constituting the impedance 15 of Fig. 2.

With an impedance network such as that shown in Figure 3, it can be shown that if in the general case the network is terminated by an impedance of value $Z_T$, the impedance presented by the network to the terminals 18a, 19a, that is the impedance looking toward the network is given by:

$$Z\ \text{input}=Z_{I1}\frac{(Z_T/Z_{I2})+\tanh\theta}{1+(Z_T/Z_{I2})\tanh\theta} \qquad (3)$$

where $\theta$ is the image transfer constant, $Z_{I1}$ is the input image impedance and $Z_{I2}$ is the output image impedance (looking toward the network).

It will be seen that if $$\left.\begin{aligned}Z_{I1}&=Z_0\\ Z_T/Z_{I2}&=\gamma\\ \tanh\theta&=A\end{aligned}\right\} \qquad (4)$$

then $$Z \text{ input}=Z_0\frac{\gamma+A}{1+\gamma A} \left.\right\} = Z_n, \text{ as defined in Equation 2a} \quad (5)$$

In this way a four-terminal network, designed in accordance with the relations given by Equations 4 above, is suitable for use as the network N in accordance with the invention.

If such a network is included in series with a source of voltage $V_0$, having an internal resistance $R_1$, and a fixed impedance Z, as shown in Figure 2, the voltage $V_n$ across impedance $Z_n$ is given by:

$$V_n=V_0\frac{Z_n}{R_1+Z+Z_n} \quad (6)$$

If $R_1+Z$ is sufficiently great in comparison with $Z_n$:

$$V_n=V_0\frac{Z_n}{R_1+Z} \quad (7)$$

In order to make $R_1+Z$ large enough it is sufficient to make either $R_1$ or Z large enough, but it is of course permissible to make both $R_1$ and Z large. In practice $R_1$ may be the anode-cathode impedance of a valve, say a triode or a pentode and the E. M. F. $V_0$ may be applied to the signal grid of the valve. In this case the effective E. M. F. is $\mu V_0$ where $\mu$ is the amplification of the valve.

From Equations 5 and 7 above $$V_n=V_0\frac{Z_0\frac{\gamma+A}{1+\gamma A}}{R_1+Z} \quad (8)$$

The attenuation can be defined as $$\alpha=20\log_{10}\left|\frac{\text{reference voltage}}{V_n}\right| \quad (9)$$

If ½ $V_0$ is taken as reference voltage, we obtain $$\alpha=20\log_{10}\left|\frac{R_1+Z}{2Z_0}\cdot\frac{1+\gamma A}{\gamma+A}\right| =20\log_{10}\left|\frac{R_1+Z}{2Z_0}\right|+20\log_{10}\left|\frac{1+\gamma A}{\gamma+A}\right| \quad (10)$$

If $$20\log_{10}\left|\frac{R_1+Z}{2Z_0}\right|$$

is called $\alpha_0$, $$\alpha=\alpha_0+20\log_{10}\left|\frac{1+\gamma A}{\gamma+A}\right| \quad (10a)$$

This expression will be seen to be in accordance with Equation 2 above, showing that the desired result is obtained. It will be apparent that in order to utilise the voltage $V_n$ which appears across impedance $Z_n$ it is necessary to use an associated load circuit impedance which is high compared with $Z_n$; the input circuit of a thermionic valve is a suitable load circuit.

In the foregoing it is important to note that $\gamma$ has been assumed in Equation 2 to be a real number the value of which is independent of frequency but can be varied by means of a variable resistor, and this implies that $Z_T$ is a resistance, say, R. Then $\gamma=R/Z_{I2}$, and since R is real and independent of frequency it is necessary that $Z_{I2}$ also be made a constant resistance. However, it is not necessary, though often convenient, to make also $Z_{I1}$ a constant resistance. Networks can be designed with specified $\theta$, $Z_{I1}$, and $Z_{I2}$, and it is comparatively simple to design constant resistance networks, i. e., networks for which $\theta$ is a specified function of frequency and $Z_{I1}=Z_{I2}=R_0$ where $R_0$ is a specified constant resistance.

Instead of the relations given by Equations 4, the following equations will also permit Equations 3 to be reduced to the required form of Equation 2a:

$$\left.\begin{array}{l} Z_{I1}=Z_0 \\ \tanh\theta=\gamma \\ Z_T/Z_{I2}=A \end{array}\right\} \quad (11)$$

If this set of relations is chosen, tanh $\theta$ has to be made independent of frequency, real and variable at will in numerical value. This means that the four-terminal network can be a purely resistive attenuator with variable attenuation. $Z_T/Z_{I2}$, on the other hand, has to vary with frequency. Since $Z_{I2}$, for a network consisting of resistances, is a resistance which does not vary with frequency, $Z_T$ must vary with frequency, i. e. the terminating impedance must be purely or at least partially reactive. It may be noted that when the attention is varied the image impedances $Z_{I1}$ and $Z_{I2}$ must be kept constant. This makes it necessary to alter more than one of the resistances forming the attenuating four-terminal network. The resulting network is indicated diagrammatically in Figure 4; the network 23 comprises input terminals 24, 25 and output terminals 26, 27, with the terminating impedance 28.

A second type of two-terminal impedance network which can be used with advantage for the network $Z_n$ is one comprising two variable resistances, a resistance $\gamma R_0$ and a resistance $R_0/\gamma$, where $\gamma$ is the parameter of variations as before and $R_0$ is a suitable reference resistance.

Figure 5:
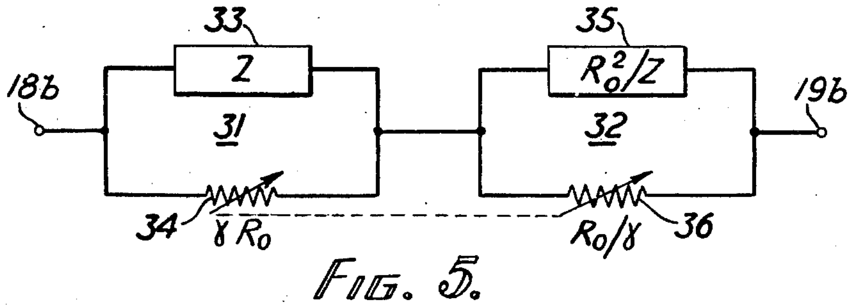

Figure 5 shows one such two-terminal impedance network having terminals 18b, 19b for connection to terminal points 18, 19 respectively of the Fig. 2 network; and consisting of two networks 31, 32 connected in series. Network 31 comprises an impedance 33 of value Z wholly or partly reactive in character, shunted by a variable resistance 34 of value $\gamma R_0$. The network 32 comprises an impedance 35 of value $R_0^2/Z$ which will accordingly be wholly or partly reactive in character, shunted by a variable resistance 36 of value $R_0/\gamma$.

It can easily be shown that this network presents between terminals 18b, 19b an impedance of value given by:

$$Z_n=R_0\frac{\gamma+R_0/Z}{1+\gamma(R_0/Z)}$$

If now $R_0$ is made equal to $Z_0$ and $R_0/Z$ equal to A, as defined above, then it will be seen that $$Z_n=Z_0\frac{\gamma+A}{1+\gamma A}$$

which is the desired relation.

Figure 6:
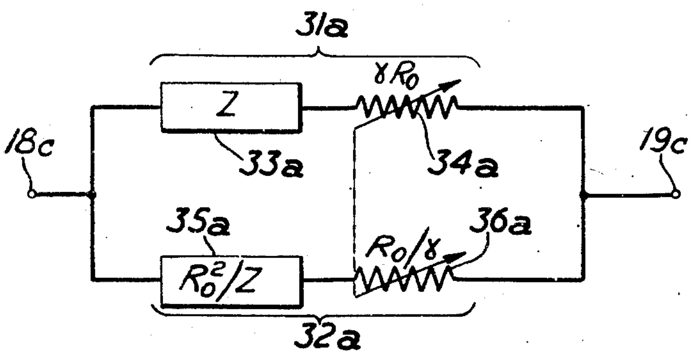

Figure 6 shows the dual, or inverse form with respect to $R_0$ of the impedance network shown in Figure 5; this network comprises two series networks 31a and 32a arranged in parallel between terminals 18c, 19c. Network 31a comprises an impedance 33a of value Z, wholly or partly reactive, and a series resistance 34a of value $\gamma R_0$. Network 32a includes an impedance 35a of value $R_0/Z$, wholly or partly reactive, in series with a resistance 36a of value $R_0/\gamma$.

It can be shown that this impedance network presents between terminals 18*c*, 19*c* *a* value given by $$Z_n=R_0\frac{\gamma+Z/R_0}{1+\gamma(Z/R_0)}$$

In this case, if $R_0$ is made equal to $Z_0$ and $Z/R_0$ equal to A, then again $$Zn=\frac{\gamma+A}{1+\gamma A}$$

as before.

In the design of networks in accordance with the invention it is to be remembered that exact concordance of the network characteristic with the ideal as set out in Equation 1 above is not possible, so that any particular design may be dictated by specific conditions of operation, or it may be desired to attain the best possible approximation to the ideal as expressed by Equation 1. With this in mind, it is possible to analyse the design of networks in accordance with the invention but inasmuch as such analysis will be familiar to those skilled in the art, it is not considered necessary in this specification to dilate upon it.

The resistances which are varied for varying the attenuation characteristic of a network according to the invention may be varied automatically when the network is used as a variable attenuation equaliser. In this case the resistances may be of the type having high temperature coefficients of resistance, the temperature of the resistances being controlled in accordance with the received amplitude of a pilot signal transmitted at constant amplitude.

I claim:

1. A two-terminal impedance network having an impedance characteristic of the form $$Z_n=Z_0\frac{\gamma+A}{1+\gamma A}$$

where $Z_n$ is the impedance of the network, $Z_0$ is an arbitrary impedance, A is a specified function of frequency and $\gamma$ is a real parameter depending upon the variable elements of the network but not upon frequency; said network consisting of two sub-networks serially connected between two terminals, one sub-network consisting of a reactive impedance of value Z and a variable resistance of value $\gamma R_0$, where $R_0$ is numerically equal to $Z_0$, and the other sub-network consisting of a reactive impedance of value $R_0^2/Z$ and a variable resistance of value $R_0/\gamma$, the reactive and resistive impedances of each sub-network being connected in parallel.

2. An impedance network having an impedance characteristic of the form:

$$Z_n=Z_0\frac{\gamma+A}{1+\gamma A}$$

where $Z_n$ is the impedance of the network, $Z_0$ is an arbitrary impedance, A is a specified function of frequency and $\gamma$ is a real parameter depending upon the values of the variable element or elements of the network but not on frequency; said network comprising two impedances connected in series, one of said series impedances comprising a reactive impedance of value Z in parallel with a variable resistance of value $\gamma R_0$, and the other of said series impedance comprising an impedance $R_0^2/Z$ in parallel with a variable resistance of value $R_0/\gamma$.

WOLJA SARAGA.

References Cited in the file of this patent

UNITED STATES PATENTS

| Number | Name | Date |
|---|---|---|
| 2,019,624 | Norton | Nov. 5, 1935 |
| 2,096,027 | Bode | Oct. 19, 1937 |
| 2,304,545 | Clement | Dec. 8, 1942 |
| 2,348,572 | Richardson | May 9, 1944 |